United States Patent [19]

Döpp et al.

[11] Patent Number: 4,584,620
[45] Date of Patent: Apr. 22, 1986

[54] MEASURING CASSETTE FOR CHECKING MAGNETIC HEAD ALIGNMENT IN A TAPE CASSETTE RECORDER

[75] Inventors: Matthias Döpp, Waldsolms; Erhard Schmidt, Giessen-Lützelinden, both of Fed. Rep. of Germany

[73] Assignee: U.S. Philips Corporation, New York, N.Y.

[21] Appl. No.: 594,638

[22] Filed: Mar. 29, 1984

[30] Foreign Application Priority Data

Apr. 14, 1983 [DE] Fed. Rep. of Germany ....... 3313550

[51] Int. Cl.[4] ............................ G11B 5/46; G11B 5/48; G11B 5/42
[52] U.S. Cl. .................................... 360/128; 360/109; 360/137; 33/180 R; 33/DIG. 13
[58] Field of Search ................. 360/137, 75, 90, 93, 360/128, 109, 104, 132; 33/172 E, 172 B, 180 R, DIG. 13; 340/686

[56] References Cited

U.S. PATENT DOCUMENTS 3,007,252 11/1961 Munn ............................... 33/178 E
3,582,217 6/1971 Trist ................................ 360/109 X

FOREIGN PATENT DOCUMENTS 7611920 9/1976 Fed. Rep. of Germany .
7700388 4/1982 Fed. Rep. of Germany .

OTHER PUBLICATIONS

Alstad et al., "Test Cartridge for Measuring Cleaning Bail Force in a Diskette Drive", *IBM Tech. Disc. Bull.,* vol. 26, No. 3A, Aug., 1983.

*Primary Examiner*—A. J. Heinz
*Assistant Examiner*—Benjamin Urcia
*Attorney, Agent, or Firm*—David R. Treacy

[57] ABSTRACT

A measuring cassette for checking magnetic head insertion distance and tape guide height in a magnetic tape cassette machine. A spring tongue in the cassette has at least one strain gauge on its surface to measure tongue bending, and is arranged to be deflected by insertion of the head into the cassette so as to sense the head surface or tape guide alignment with respect to the cassette.

6 Claims, 6 Drawing Figures

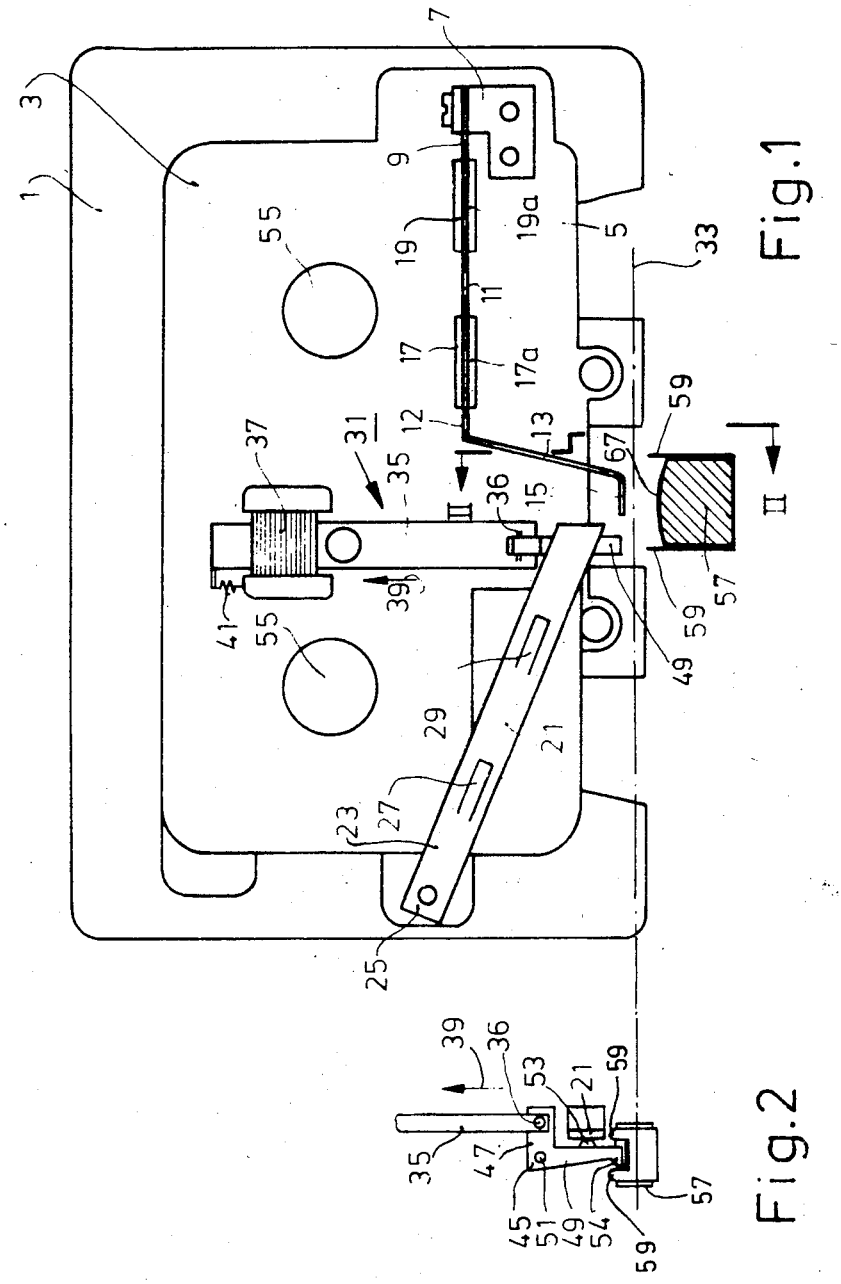

MEASURING CASSETTE FOR CHECKING MAGNETIC HEAD ALIGNMENT IN A TAPE CASSETTE RECORDER

BACKGROUND OF THE INVENTION

The invention relates to a measuring cassette for measuring the position of at least one magnetic head in a magnetic tape cassette recorder along different coordinates with respect to the transport path along which the magnetic tape of a magnetic tape cassette is passed in front of the headface of the magnetic head during play operation.

For measuring the positions of the magnetic heads within magnetic tape cassette recorders, it is usual to use gauges with which the position of the magnetic head is adjusted. If, however, the housing of such a recorder is already closed up due to its housing having been fitted, then it is not possible to measure the position of the magnetic heads with respect to the magnetic tape.

SUMMARY OF THE INVENTION

It is the object of the present invention to create a measuring cassette, for measuring the position of at least one magnetic head in a magnetic tape cassette recorder, which will indicate the position of the magnetic head inside the cassette recorder simly and reliably.

Another object is to provide such a cassette which enables display of the head position along a plurality of coordinates with respect to the tape transport path, at a location separate from the point of measurement.

According to the invention the measuring cassette comprises at least one spring tongue which is connected to the cassette at one end portion, the free end of the spring tongue being positionable to scan the position of the magnetic head along a coordinate in the plane of tape transport and/or perpendicularly to it. The spring tongue includes an electrical straing gauge arrangement on at least one surface, and connections to convey measured values determined by it to an indicating instrument.

Such a measuring cassette makes it possible to determine the magnetic head position inside the cassette recorder both with the recorder housing removed or fitted, and then display the reading outside the recorder housing.

Spring tongues fitted with electrical strain gauges have been described in German patent DE-PS No. 31 42 685, to which U.S. application Ser. No. 421,938 filed Sept. 23, 1982 corresponds. In this case the strain gauges are used, however, to determine the torque at the winding spindles of a cassette recorder.

In another embodiment of the measuring cassette according to the invention, at the free end of the spring tongue a sensor is fitted, the sensor being relatively movable with respect to the headface of the magnetic head with the spring tongue perpendicularly to the plane of tape transport. This construction is particularly simple because the spring tongue can be configured in such a way that its spring acts against the magnetic head.

According to a further embodiment of the invention, between measuring operations the free end of the spring tongue is positionable, by means of a setting mechanism, into a contact-free central position between fork prongs of the associated tape guide fork at the magnetic head. In this central position the spring tongue can travel freely between the fork prongs, for example while the head is being inserted into the cassette. In this case the setting mechanism ensures that the tongue can only exercise its measuring function when the cassette with the tape is inserted in the machine. Outside the measuring operations, during insertion and removal of the cassette the tongue is aligned between the prongs of the tape guide fork by the setting mechanism in such a way that neither the setting mechanism nor the insertion and removal of the cassette are impeded by the prongs.

In a further embodiment of the invention, the setting mechanism comprises a rod which is movable inside the measuring cassette perpendicularly to the tape transport plane, the rod being retractable by means of an electromagnet against the force of spring. The rod movement actuates a sensing lever which, during a measurement, is pressed against a fork prong; between measurements the lever swivels away from the prong into the free space between the two prongs, and in moving away the lever raises the tongue which has been pressed against it by spring force.

The invention will be described in more detail with reference to the drawings.

BRIEF DESCRIPTION OF THE DRAWING

FIG. 1 is a plan view of a measuring cassette with spring tongues, which can scan the position of the magnetic head of a magnetic tape cassette recorder, in the tape transport plane and at right angles to it, shown before the head is moved into the cassette;

FIG. 2 is a section through the measuring cassette along the line II—II in FIG. 1, after the magnetic head is moved into the cassette in the play position;

DESCRIPTION OF THE PREFERRED EMBODIMENTS

Figure 3:
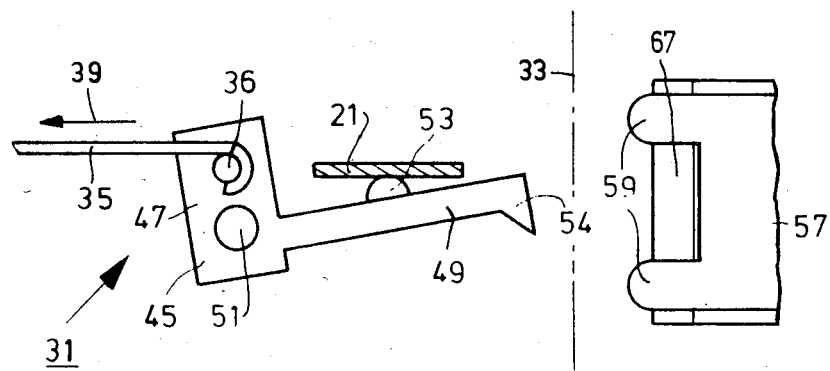
FIGS. 3 to 5 are three different enlarged diagrammatic views showing the interplay of the measuring cassette and magnetic head as shown in FIG. 2.

FIG. 1 shows the frame 1 of a cassette housing. A number of components are arranged in the free space 3 inside this frame. For instance, an end portion 9 of a spring tongue 11 is fixed to the bottom housing wall 5 by means of a bracket 7. At the other, free end 12 the spring tongue 11 supports an angled piece 13 with a sensor 15. Strain gauges 17, 17a and 19, 19a are fixed to both surfaces of the tongue 11. These strain gauges extend in the longitudinal direction of tongue 11, as a further tongue 21 on the lefthand side of FIG. 1 shows.

The tongue 21, like the tongue 11, is fixed or clamped at one end portion 23. In the case of the tongue 21, for example, the clamping 25 is in the frame 1. The tongue 21 is offset in the longitudinal direction by 90° with respect to tongue 11 so that it is to be seen in two dimensions in FIG. 1. Strain gauges 27 and 29 are also fitted on the top of tongue 21, and strain gauges are similarly placed on the underside of tongue 21. These strain gauges also extend in the longitudinal direction of the tongue 21.

The tongue 21 interacts with a setting mechanism 31. As also shown in FIG. 2, this setting mechanism comprises a rod 35 which moves in the measuring cassette perpendicularly to the plane of transport 33 of the magnetic tape. This rod 35, made of soft iron, is passed through an electromagnet 37 and can be attracted by this electromagnet 37, when excited, in the direction of an arrow 39 against the action of a tension spring 41 which strives to move the adjusting rod 35 in the direction of the tape transport plane 33. The adjusting rod 35 is connected via a linkage 36, fitted to the rod 35, to a double-arm sensing lever 45 which can pivot about a fixed axis 51 parallel to the plane 33, provided at the junction between the lever arms 47 and 49. The lever 45 has a spacer boss 53 against which the spring tongue 21 constantly presses. The lever arm 49 carries a probe tip 54 at its free end.

Before the measuring cassette is inserted in the cassette recorder, during which insertion the winding spindles pass through apertures 55 in the bottom wall 5, a magnetic head 57, which is typically mounted on a movable head plate (not shown) in the recorder, remains positioned outside the tape transport plane 33 (position of FIG. 1 and FIG. 3). The magnetic head 57 is shown in section in FIG. 1, and side view in FIGS. 2-5. These figures show two guide forks, each with a pair of guide fork prongs 59 arranged one on the upper and one on the lower side of the magnetic head 57.

Figure 4:
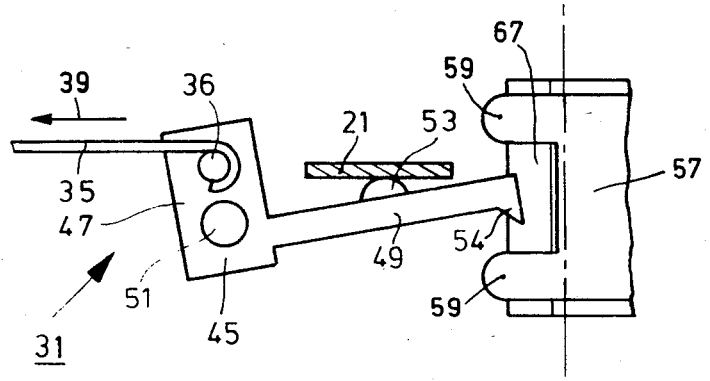
Figure 5:
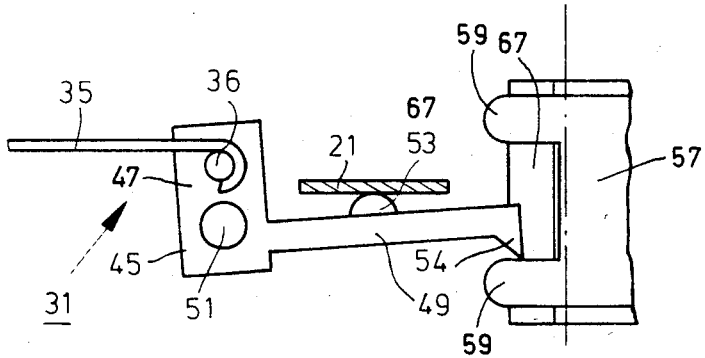

FIGS. 2 to 5 illustrate, with the aid of the sectional view in FIG. 1, a detail of the measuring cassette in which only the magnetic head 57, with the guide fork on one side and its guide fork prongs 59, and the setting mechanism 31 are shown. The magnetic head 57 with its prongs 59 is illustrated in FIG. 3, still outside the setting mechanism 31. In the next step, the head is to be inserted into the cassette, for example by moving the head plate (not shown) and the head toward the cassette to the play position. In this process, the prongs 59 advance, one above and one below the probe tip 54, so that the tip of the arm 49 will be between the fork prongs 59 (FIG. 4). The adjusting rod 35 is pulled in the direction of the arrow 39 by the electromagnetic 37. Thus the lever 45 together with the free end of tongue 21 are arranged in such a way that the probe 54 and end of the arm 49 are able to fit between the fork prongs 59 on one side of the magnetic head 57. After the head plate has moved to the play position, the measurement as to whether the fork prongs 59 are guiding the magnetic tape properly is performed by releasing the electromagnet 37. The spring 41 draws the adjusting rod 35 towards the magnetic head, and the lever 45 rotates until the probe tip 54 rests against the lower one of the fork prongs 59 (FIG. 5). The tongue 21 follows the second lever arm 49 under the action of the spring and transmits via electrical connection leads (not shown) a signal relating to the vertical or height position of the magnetic head 57 to an indicating device (not shown). The indicating device displays whether this component of the position of the magnetic head 57 is correct.

If the cassette has been inserted and the magnetic head 57 brought into the play position, as shown in FIG. 2, then the head face 67 of the magnetic head 57 has been pushed against and has displaced the sensor 15. Movement of the sensor 15, as the head face 67 reaches the position with respect to the plane 33 shown in FIG. 4, displaces the free end 12 and bends the tongue 11. These movements are also transmitted via electrical leads (not shown) to the indicating instrument (not shown) because the strain gauges 17, 17a, 19, 19a measure the displacement of the tongue 11. The measuring unit then displays whether the position of magnetic head 57 perpendicular to the plane 33 is correct or any changes are still required.

Figure 6:
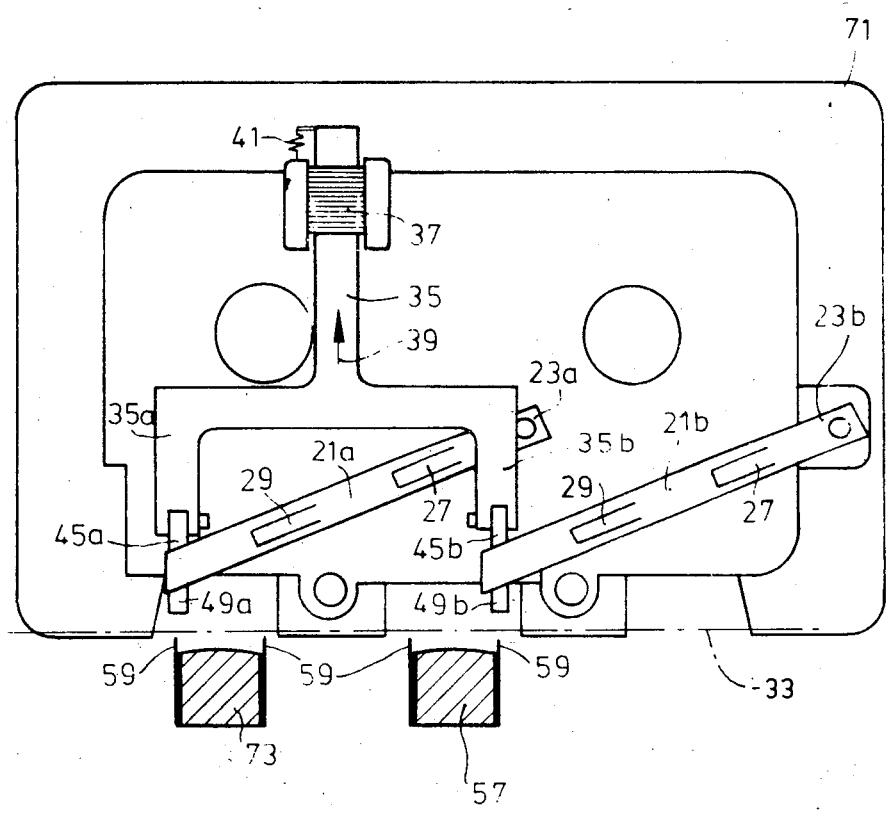
FIG. 6 is a plan view of another measuring cassette embodiment for measuring the difference in head heights between a recording/reproducing head and an erase head.

FIG. 6 shows a somewhat modified frame 71 of a second embodiment measuring cassette according to the invention. In this case the measuring cassette is designed in such a way that both the recording/reproducing head 57 and an erase head 73, which are typically mounted on a common head plate, can be measured in one operation. Once again the adjusting rod 35 can be moved by means of the electromagnet 37 in the direction of the arrow 39 against the action of a tension spring 41.

In order then for the adjusting rod 35 to be able to measure both magnetic heads 57 and 73, it is split into two rod arms 35a and 35b a distance outside the area of movement in the electromagnet 37. The rod arms 35a and 35b interact with sensing levers 45a and 45b just like the unsplit adjusting rod 35 in FIG. 1. Tongues 21a and 21b which are fixed at one end 23a and 23b to the measuring cassette and can move freely with their other ends press against the levers. As in the first embodiment, strain gauges are fixed to the tongues 21a and 21b, either on one side or both sides, and the measured results of these strain gauges can be transmitted via electrical connections (not shown) to an indicating instrument (not shown).

When the adjusting rod 35 is attached by the electromagnet 37 in the direction of the arrow 39, the levers 45a and 45b are pivoted in such a way that both the levers with their second arms 49a, 49b (FIGS. 2, 4 and 5) and the free ends of the spring tongues 21a and 21b pass between the opposed fork prongs 59 without pushing against them when the magnetic heads 57, 73 are retracted. On de-energization of the electromagnet 37, following movement of the head plate and heads 57, 73 to the play position, the tension spring 41 pulls the adjusting rod 35 towards the magnetic heads 57, 73, and the second lever arms 49a and 49b drop onto the fork prongs 59. The spring tongues 21a and 21b which follow the second lever arms 49a and 49b bend in such a way during this process that the strain gauges on them detect the vertical position of each of the heads 57, 73 in the plane 33 and transmit this in the form of electrical signals to the indicating device not shown.

We claim:

1. A measuring cassette for measuring the position of at least one magnetic head in a magnetic tape cassette recorder with respect to at least one coordinate defined by (i) a tape transport path along which a magnetic tape of a magnetic tape cassette is passed, and (ii) a plane of tape transport along the face of the magnetic head during play operation of the recorder with the head in the play position, said cassette comprising:

a frame, at least one spring tongue having an end portion connected to the frame, and a free end, means, including said free end, for scanning a surface of a magnetic head of a cassette recorder into which the measuring cassette has been inserted, which head has been inserted into the measuring cassette in a play position of the recorder, and for bending said tongue a distance proportional to the position of the scanned surface, and at least one electrical strain gauge arrangement mounted on a surface of the tongue for sensing bending of the tongue.

2. A cassette as claimed in claim 1, characterized in that said means for scanning and bending comprises a sensor fitted at the free end of the spring tongue, said tongue being arranged and proportioned such that said bending of the tongue is a result of movement of the sensor and free end in a direction perpendicular to the plane of tape transport upon scanning engagement of the sensor by a surface of the magnetic head while said head is being inserted into the cassette.

3. A cassette as claimed in claim 1, characterized in that said means for scanning and bending comprises a sensor fitted at the free end of the spring tongue, said tongue being arranged and proportioned such that said bending of the tongue is a result of movement of the sensor and free end in directions perpendicular to the plane of tape transport, upon scanning engagement of a surface of a magnetic head which has been inserted into the cassette, by the sensor.

4. A cassette as claimed in claim 1, characterized by comprising means for positioning the free end of the spring tongue into a contact-free central position adjacent a prong of a tape guide associated with the magnetic head, so arranged that between measuring operations the spring tongue can travel freely past said prong.

5. A cassette as claimed in claim 4, characterized in that said means comprises a rod mounted to be movable inside the cassette perpendicularly to the tape transport plane;
  means for biasing said rod toward the tape transport plane;
  electromagnetic means for retracting said rod against force exerted by said biasing means; and
  a lever actuated by said rod, arranged such that during measurement the lever is pressed against the guide prong of the magnetic head, and between measurements the lever swivels away from the prong into space adjacent the prong, said spring tongue being arranged to press by spring force against the lever so as to be lowered and raised by respective movement of the lever.

6. A cassette as claimed in claim 5, characterized in that said lever is pivotable about a pivot axis fixed with respect to said frame, and comprises two arms forming an angle with respect to one another, a first of said two arms being linked to said rod for pivotal motion in response to rod movement.

* * * * *